Nov. 4, 1941.   R. L. WILCOX   2,261,318
MEANS AND METHOD FOR MAKING SOCKETED ARTICLES
Filed March 16, 1940   5 Sheets-Sheet 1

INVENTOR
RICHARD LESTER WILCOX
BY George E. Hall
ATTORNEY

Nov. 4, 1941.   R. L. WILCOX   2,261,318
MEANS AND METHOD FOR MAKING SOCKETED ARTICLES
Filed March 16, 1940   5 Sheets-Sheet 2

INVENTOR
RICHARD LESTER WILCOX
BY George E. Hee
ATTORNEY

Patented Nov. 4, 1941

2,261,318

UNITED STATES PATENT OFFICE 2,261,318

MEANS AND METHOD FOR MAKING SOCKETED ARTICLES

Richard Lester Wilcox, Waterbury, Conn., assignor to The Waterbury Farrel Foundry and Machine Company, a corporation of Connecticut Application March 16, 1940, Serial No. 324,367

40 Claims. (Cl. 10—10)

This invention relates to a new and improved means and method for making socketed articles such as headless set screw blanks, rivets and the like, although not limited thereto.

An object of the invention is to automatically produce such blanks from a wire length on a single machine, with the minimum number of operations, without loss of material, and at a relatively high speed.

As illustrated and described, the invention may be applied to the production of a form of headless set screw, having a socket in one end, shown herein as hexagonal, and a bevelled edge, or to a rivet or the like, having a socket in one end thereof, such as a tubular rivet.

By the means and method shown and described and with one form of the invention, a wire length, preferably cylindrical in cross section, is fed into a header, upsetting machine or the like, a portion of the inner end is cut therefrom which now becomes a blank. This blank is transferred to tools which press a relatively shallow recess in one end and bevel the adjacent outer edge, and the opposite end is squared, so that it is at a right angle to the axis of the blank. Such squaring rectifies any angularity there may be at the end of the blank caused by the cut-off mechanism. From these tools the blank is transferred to another set of tools wherein the shallow recess is formed by pressure and extrusion into a socket of the required depth and of any desired cross section. The socket is formed for a portion of its depth by endwise pressure and increased to its full depth by lateral pressure or extrusion. The application of these pressures first expands the blank, adjacent to the socket, while both ends of the blank are supported, which assures its being held centrally. Thereafter, the blank, with the same tools, is restored to its former shape and the socket increased to its full depth. The blank is then ejected and stripped from the tools, ready to be threaded by any preferred mechanism (not shown).

In another form of the invention, the outer end of the blank may be upset in one or more dies before being presented to the tools for the socketing operation. The shape of the blank as presented to the socketing tools may be varied greatly within this invention.

It is a further object of this invention to produce the socket in the blank in a predetermined position, and of a maximum depth, without injury to the tools, and at the same time produce a perfect, finished blank.

Other and further objects will be apparent from the following description and accompanying drawings.

To these and other ends this invention relates to means and method for making socketed articles, substantially herein shown and described and more particularly pointed out in the claims.

Referring to the drawings, in which like numerals of reference indicate like parts in the several figures.

Figure 1:
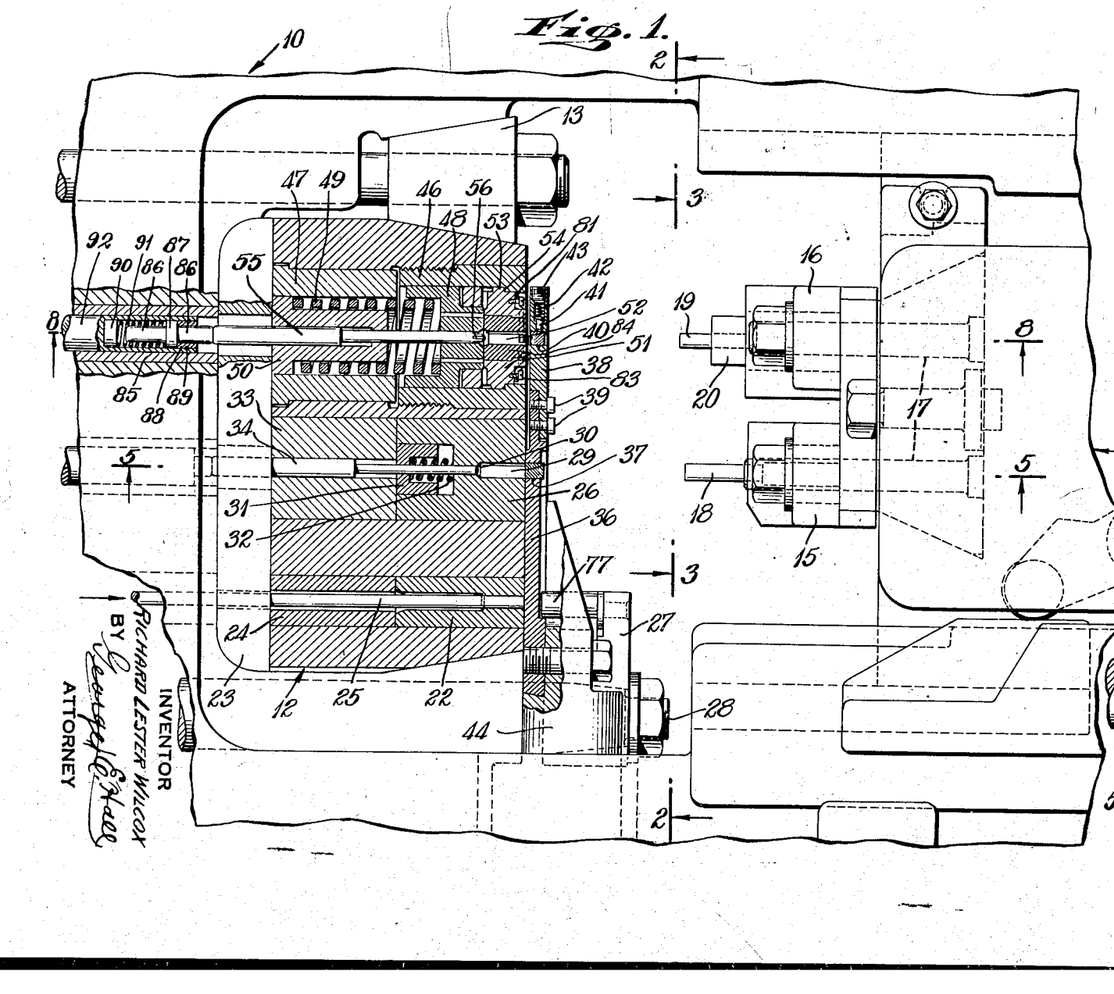
Figure 1 is a fragmentary plan view of a header or upsetting machine adapted for use in the practice of this invention.
Figures 2, 3, 16, 17:
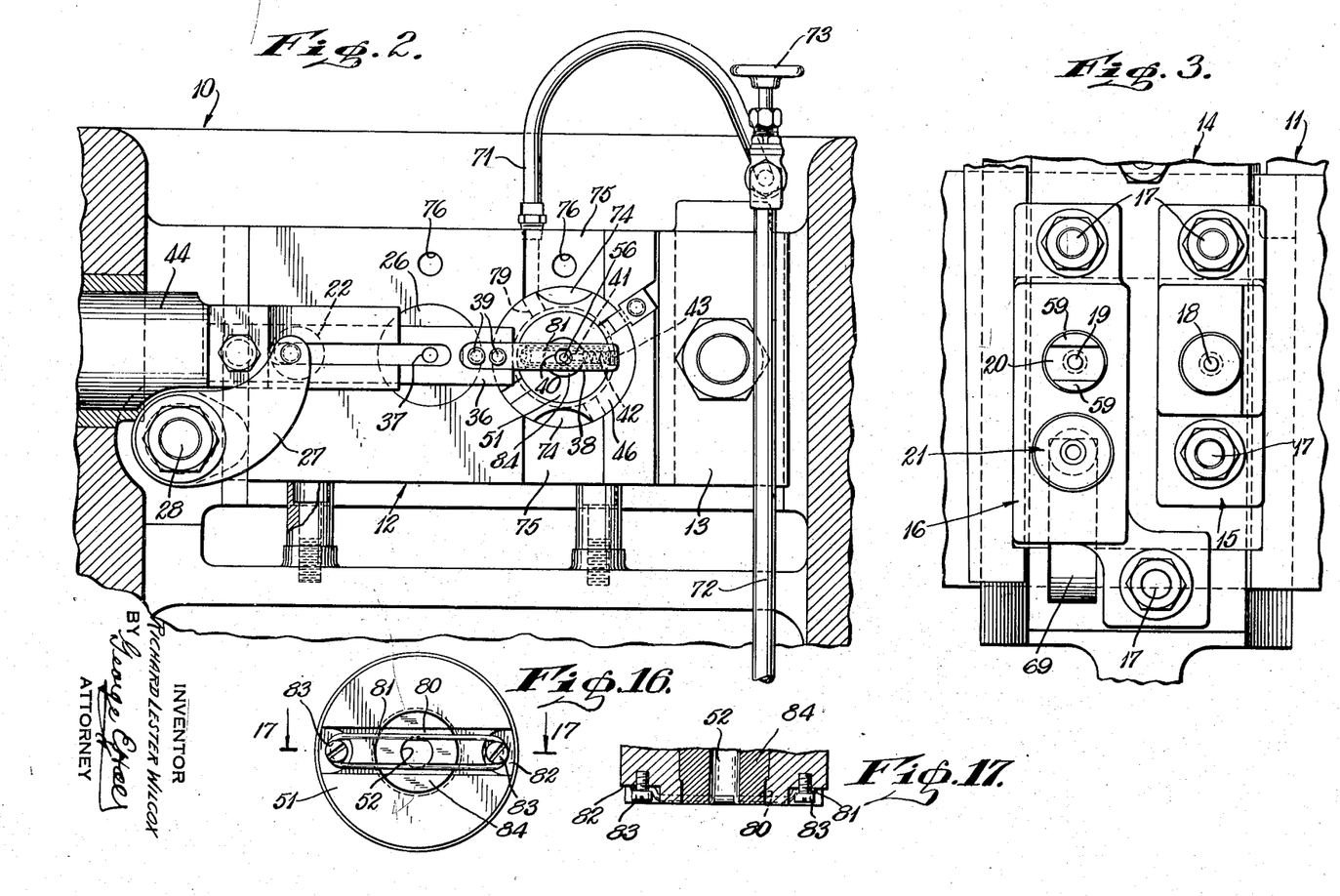
Figure 2 is a fragmentary sectional view, the parts in section being taken generally upon line 2—2 of Figure 1.
Figure 3 is a fragmentary view of a portion of the gate with the punch block and punch holders associated therewith.
Figure 16 is an enlarged view of the socketing die.
Figure 17 is a fragmentary view thereof, the parts in section being taken upon line 17—17 of Figure 16.

In the drawings a conventional header or upsetting machine is indicated by the reference numeral 10, having a reciprocating gate 11, actuated in the usual manner, with a die block 12 held rigidly by a wedge 13 or the like. On the face of the gate 11 a punch slide 14 is movable transversely thereof by mechanism not shown, but well known both in structure and operation. On this punch block are two punch holders 15 and 16, fixed in adjusted positions by bolts 17 or the like. Within the punch holder 15 is a punch 18 and in the punch holder 16 are the punches 19 and 20 and stripper mechanism 21.

Figures 5, 6, 7:
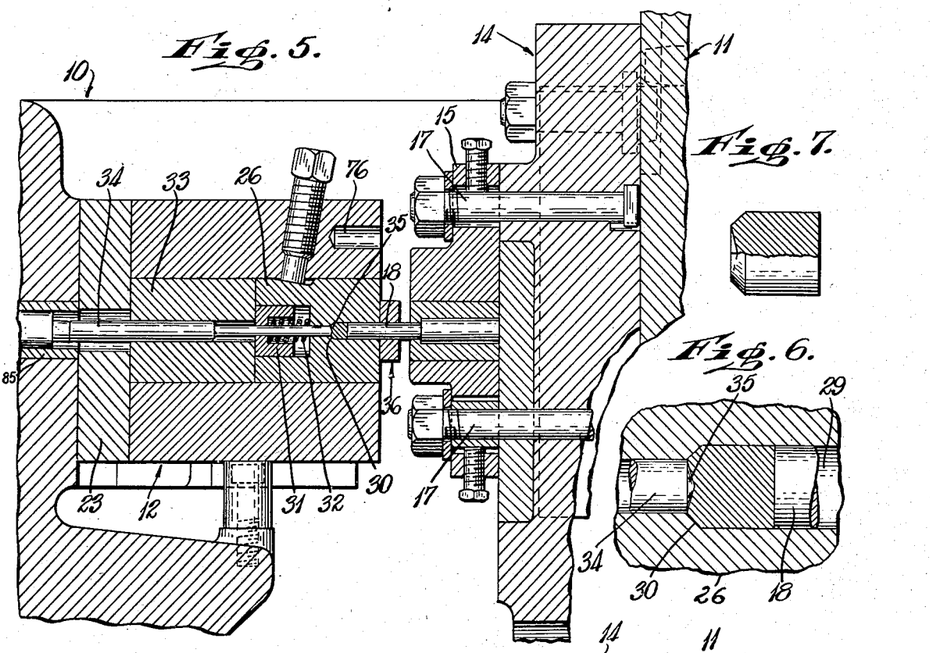
Figure 5 is a transverse sectional view of one set of tools and adjacent mechanism, the parts in section being generally taken upon line 5—5 of Figure 1, with the gate and punches shown in their forward positions, as distinguished from the rear positions, as in Figure 1.
Figure 6 is an enlarged sectional view of a blank in a fragmentary portion of one set of tools.
Figure 7 is a fragmentary view of the blank as shaped by one set of tools.

In the die block 12 is a cut-off die 22, between which and the backing plate 23 is a quill 24, having an opening therethrough that is preferably larger than the rod or wire length 25. Through this quill and the cut-off die the rod is successively advanced by feed mechanism (not shown) until the inner end thereof projects beyond the face of the cut-off die 22 a predetermined distance and engages a stop 77, fixed in arm 27 on a shaft 28. This shaft is adjustable to vary the position of the stop and is movable in a circular path to carry the stop out of alignment with the die, if desired. Fixed in the die block 12 is the die 26, having a recess 29 with a flaring bottom 30. Slidably mounted in a recess in the rear of the die is a block 31, moved rearwardly by a spring 32 against the filler block 33. A combined punch and knockout pin 34 is slidably mounted within the filler block 33, block 31 and die 26, the outer end 35 of which is coned substantially as shown in Figure 6.

Figure 4:
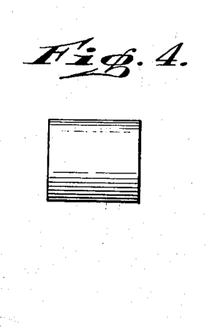
Figure 4 is a view of a blank as cut from the wire length.

Movable across the face of the die block 12 is a transfer mechanism, consisting essentially of a slide 36 having an opening 37 herein. Fixed to this slide by screws 39 is an extension member 38 having an opening 40 therethrough. The extension member 38 may be integral with the slide 36 if desired. The diameters of the openings 37 and 40 are substantially the same as that of the wire rod. A detent 41, movable in the extension member 38, is backed by a spring 42, held with a variable tension by a screw 43. The slide 36 is fixed to a cut-off bar 44 which has a reciprocatory movement in relation to other parts by means not shown but well known. When in one position the opening 37 in the slide 36 is in register with the opening in the cut-off die 22 and opening 40 in register with the recess 29 in the die 26. When so positioned, the wire rod is fed forward through the opening 37 until it engages the stop 77. The slide now moves inwardly and that portion of the wire rod projecting beyond the face of the cut-off die 22 is cut therefrom by the slide and is carried thereby into register with the recess in the die 26. A view of this cut-off portion, now a blank, is shown in Figure 4. When the blank, just severed from the wire length, is in the position substantially as shown in Figure 1, the gate has moved forward and the punch 18 engages and pushes the blank out of the slide 36 into the recess 29 in the die 26. The punch pressure continues until some of the parts are in substantially the position shown in Figure 6, at which time the inner end of the blank has been recessed by the coned end 35 of punch 34, the adjacent edges thereof beveled by the flaring throat 30 of the recess 29, and the outer end of the blank has been squared by the punch 18 so that it is at a right angle to its axis. Such squaring is only necessary if perchance the end of the blank is cut at a slight angle, which sometimes happens, due in a large measure to the character of the metal in the rod. While the punch 18 is moving inwardly within the recess 29, the combined punch and knockout pin 34 is held rigid. However, as the gate 11 returns to its rear position the punch 18 is withdrawn from the die 26 and slide 36, followed by the blank, shaped as in Figure 7, which is projected through the recess 29 under pressure of the punch and knockout pin 34. After the punch 18 has been withdrawn from the slide 36, and before the blank reaches the slide, the latter is moved until the opening 37 is in register with the opening in the die 22 and the opening 40 is in register with the recess 29 in the die 26. When so registered, the blank is projected into the opening 40 and there held under slight pressure by the detent 41 and spring 42. As the coned end of the punch 34 projects into the inner end of the blank the punch is projected a slight distance beyond the face of the die 26 as the blank is ejected therefrom in order that the blank will clear the face of the die. When so positioned, the punch 34 is withdrawn quickly by the spring pressed block 31, the rear face of which is engaged by the shoulder formed by the junction of the two diameters of the combined punch and knockout pin 34 as the latter moves forwardly to eject the blank from the die 26 (see Fig. 5).

Figures 8, 9, 10:
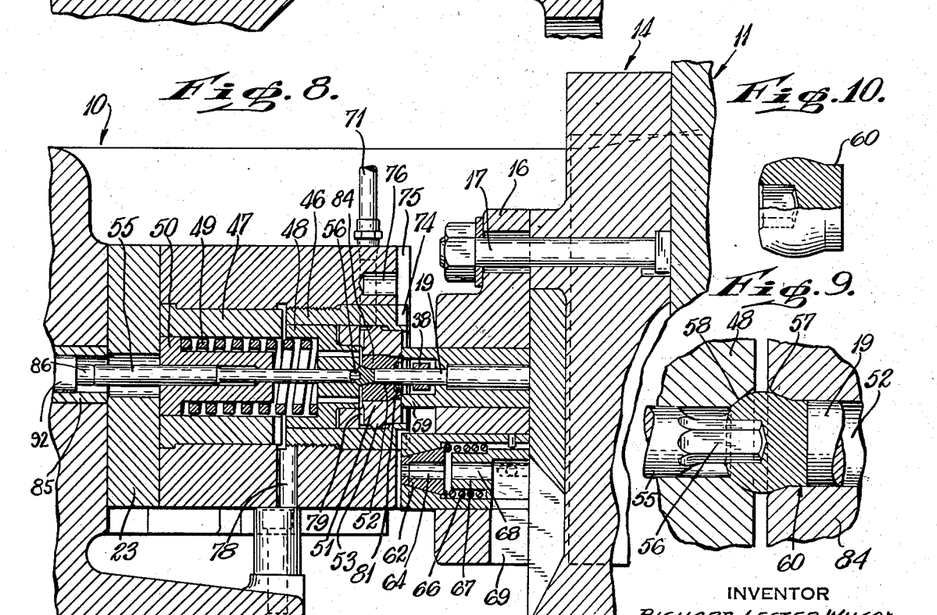
Figure 8 is a view similar to Figure 5 of another set of tools, the parts in section being taken generally upon line 8—8 of Figure 1.
Figure 9 is an enlarged sectional view of a blank in a fragmentary portion of one set of tools.
Figure 10 is a fragmentary view of the blank as partially shaped by one set of tools and before being returned and ejected therefrom.
Figure 11:
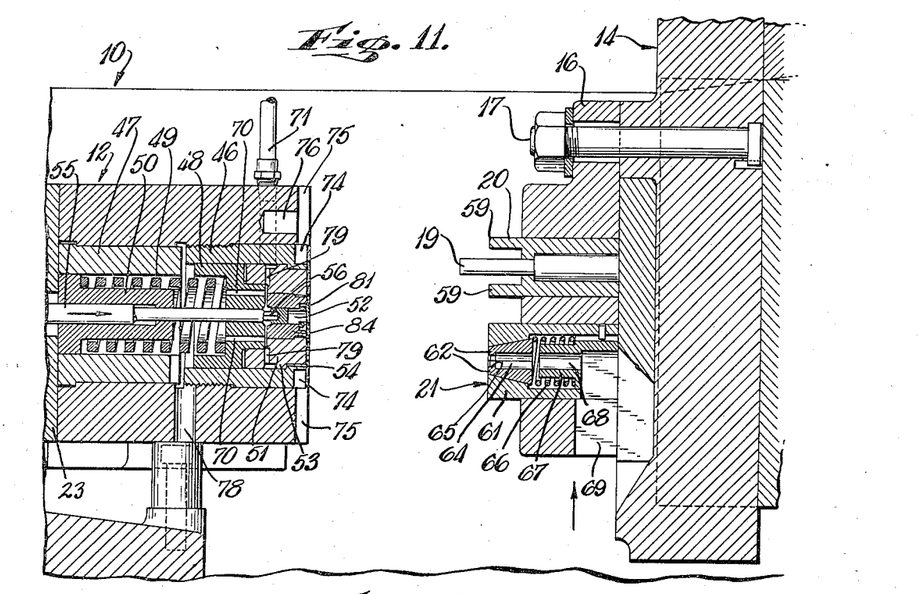
Figure 11 is a view similar to Figure 8, with the gate and punches in their retracted positions, and a blank being returned through the die of one set of tools.
Figure 12:
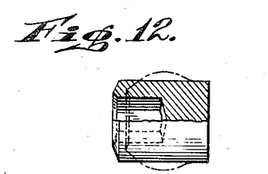
Figure 12 is a fragmentary view of a blank as completed by the means and method herein disclosed and ready to be threaded.
Figure 13:
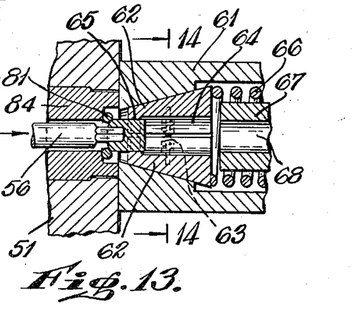
Figure 13 is an enlarged sectional view of the stripper mechanism, with a blank in one position therein.
Figure 14:
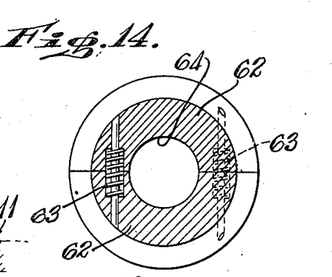
Figure 14 is a sectional view of the stripper mechanism, the parts in section being taken generally upon line 14—14 of Figure 13.
Figure 15:
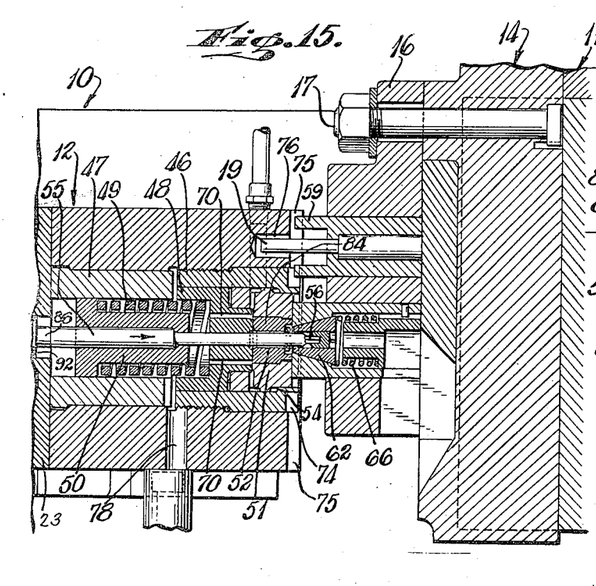
Figure 15 is a sectional view similar to Figure 8, with the stripper mechanism in operative position.

Within the die block 12 a sleeve 46 is threaded, and concentric therewith is a backing sleeve 47. Movably mounted within the sleeve 46 is an inner die 48, which is constantly under the pressure of a spring 49, which surrounds the reduced portion of a sleeve 50 within the backing sleeve 47. The forward end of the die 48 projects into a recess in the rear of the die carrier 51, holding the outer die 84 through which is an opening 52 of greater length than the blank, and concentric with a similar opening in the die 48. New dies 84 as replacements or with an opening therethrough of a different diameter or shape, may be inserted in the die carrier 51 as desired. The inner end of the opening 52 has a rounded or extension throat 57, and the oppositely disposed outer end of the opening through the die 48 has a throat with a flaring wall 58, substantially as shown in Figure 9, this latter being at substantially the same relative angle as the flaring bottom 30 in the die 26. A collar 53 on the outer die carrier 51 engages a lip 54 in the sleeve 46 (Figure 1) that limits the axial movement of the die carrier 51 in one direction.

Projecting through the sleeve 50 is a combined punch and knockout pin 55. The outer or socketing end 56 of this punch is substantially hexagonal in cross section with its tip coned, as is the punch 34. This socketing end 56 projects into the cavity between the dies 84 and 48 (Figure 1) before it is engaged by a blank that is projected through the die 84.

A knockout rod 92 is slidably mounted in the fixed sleeve 85 and within the inner end thereof is a spring pin 86, the outer end of which is in engagement with the knockout pin 55. Outward movement of the spring pin is limited by the bushing 88 fixed in the end of the knockout rod, and a spring 91 between the collar 87 and the button 90 urges the spring pin outwardly. The knockout rod 92 is actuated in timed relation to other parts by mechanism not shown but well known both as to structure and operation.

As the gate 11 moves forwardly, the punch 19 engages the blank in the opening 40 and pushes it out of the extension member 38 and into the opening 52 in the outer die 84. This pressure is continued and the coned recess in the inner end of the blank engages the coned tip at the end of the socketing punch. This punch then supports and holds the inner end of the blank centrally. Further pressure on the blank causes the socketing punch to recede until the bevelled inner end of the blank engages the flaring wall 58 in the die 48. The blank is now supported centrally at both ends, in the die 84 at one end and by the flaring wall 58 in the die 48 at the other end. As thus supported, a central socket is assured. While in this position only a relatively short portion of the outer end 60 (Figure 10) of the blank remains in the opening 52, this latter portion retaining its original shape.

Figure 18:
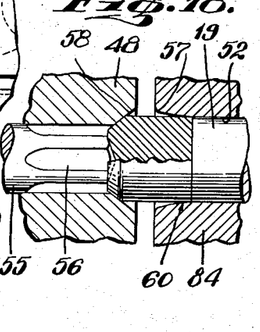
Figure 18 is an enlarged sectional view of a blank in a fragmentary portion of the set of tools, as shown in Figure 9, with the inner end in contact with the flaring walls of one of the tools, and the socketing tool in a retracted position.

When the blank is in engagement with and supported by the inner die 48, as described, the spring pin 86 has been pushed back by the knockout pin 55 against the tension of the spring 91, and the end thereof is in engagement with the button 90. The knockout pin 55, with the socketing tip 56 thereof, is at rest and in a stationary position. During the movement of the blank, above described, the inner die 48 is pushed rearwardly against the tension of the spring 49 until there is an open space between the dies, as shown particularly in Figure 18.

Continued pressure on the blank forces the end of the blank over the socketing tip 56, which is thereby projected into the blank, and the metal near the inner end of the blank flows outwardly in all directions and the walls of the expanded portion of the blank engage the flaring walls 57 and 58, substantially as shown in Figure 9. While under the pressure that causes the bulging or expansion of the blank, the latter is held centrally and against canting or lateral movement in relation to the axis of either the socketing punch, the punch 19, or the blank itself, thus assuring a blank with a concentric socket. As the length of the blank is shortened by reason of its expansion under pressure, the die 84 follows the blank, constantly maintaining its central hold upon the end thereof. The width of the decreased space at this time between the dies is shown in Figure 9. During this operation the two tips 59 of the forked end of punch 20 straddle the extension member 38, engage and move the die carrier 51 and die 84 inwardly. The blank as molded in the tools as just described, is shown in Figures 9 and 10, the hexagonal socket therein being surrounded by a bulging or expanded portion. That end portion of the blank designated 60, as before indicated, has retained its original diameter and is supported in the opening 52 with that portion in advance thereof supported axially only by the punch 55 with the bulging portion engaging the extrusion throat 57 and flaring wall 58 with an open space therebetween. At times a blank only slightly oversize will overfill the cavity between the dies 84 and 48, setting up a very severe bursting pressure, which normally would break or damage the tools. In this device such a bursting pressure would be relieved by the die 48 yielding under its spring pressure without damage or injury to any of the tools. As the gate 11 withdraws, the knockout pin 55 moves forward and forces the blank through the opening 52, the bulging or expanded portion of the blank being extruded as it passes through the extrusion throat 57 and is thereby restored to its original diameter, the metal flowing endwise around the hexagonal socketing punch 56 and deepening the socket. As the coned tip of the knockout pin 55 projects into the cavity between the dies 84 and 48 it engages the inner end of the blank as it is projected into the cavity, thus supporting and centering it. Hence if a very short blank should perchance pass through the opening 52 into the cavity between the dies, it is under control and cannot fall free into the cavity, resulting in a glancing or lateral strain upon the socketing punch 56, causing it to break or otherwise damage and injure the tools. This liability to damage is increased if perchance the short blank should be cocked sideways or fall out of a central portion. While the blank is being returned through the die 84, the punch holder carrying the punches 19 and 20 is shifted on gate 11, bringing the stripper mechanism into register with the punch 56, and engaging the face of the outer die 84. This stripper mechanism is constructed with a sleeve 61 fixed in the punch holder in any convenient manner, within which is a cone chuck having two jaws 62, with a conical exterior which engage conical walls on the interior of the sleeve. These jaws are pressed apart by springs 63 in a well known manner, as the chuck is moved in one direction within the sleeve. When the jaws 62 are together, the bore 64 in the rear end of the chuck is substantially the same diameter as that of the blank and the outer end 65 is slightly smaller. A spring 66 surrounds a fixed member 67 and engages the chuck jaws and applies tension thereto, thus tending to maintain the jaws in their forward position. The blank as it moves out of the outer die 51 is projected into the smaller outer bore 65 of the chuck, the jaws yielding slightly for that purpose. After the blank has passed this bore the jaws close therearound under pressure of the spring 66. The gate now withdraws and the completed blank pulled off the socketing end of the punch 56 in a straight line, the socket or outer end of the blank engaging the wall between the two diameters in the chuck. Each succeeding blank forces the preceding blank through the opening 68, which registers with an opening in the chuck, and then into the opening 69, from which the blanks fall by gravity into a receptacle conveniently arranged to receive them. It is desirable, while the blank is being extruded, that ample lubrication should be applied thereto. For this purpose, radial openings 79 are provided in the die carrier 51 substantially opposite the face of the inner die 48, and through which are discharge openings 70.

Fixed in the die block, opposite the radial openings 79, is a feed pipe 71, connected with a pipe 72, leading to a pump, with a suitable valve 73 therebetween. By this means a constant supply of oil is admitted through pipes 71 and 72 to the openings 79, where it surrounds the blank and then escapes through the discharge openings 70 and 78. Notches 74 are formed in the outer end of the sleeve 46 so as to receive the tips 59 of the punch 20 when in a forward position. The face of the die block is cut away at 75, and in the bottom of which is a recess 76 to receive the tips 59 and punch 19 when the gate is in its forward position and stripper mechanism in operative register with the die 84.

In a recess 80 in the face of the outer die 14 and die carrier 51 is a flexible member 81, having substantially parallel sides, that is held securely by binding screws 83 within the recess 82, that is deeper than the recess 80, so that the heads of the screws 83 will be below the face of the die. The sides of this flexible member project slightly over the opposite sides of the opening 52 in die 84 when the opening is unobstructed, substantially as shown in Figure 16. They are spread apart by the blank and punch 20 when the latter are projected into the die opening, and return to their original relative position when the punch is withdrawn and the blank ejected. In practice it has been found that if perchance the hexagonal socketing end 56 of the punch should break while the blank is still in the opening 52 of the outer die 84 it has a tendency to jump ahead of the knockout pin and out of the die in advance of the timing of the knockout pin. The blank under such circumstances is liable to be caught on the face of the die and punch and cause damage. This tendency, however, is overcome by the flexible member 81 which applies a slight pressure to the sides of the blank and restrains the action of the blank, holding it in timed relation with the knockout punch. In brief, this flexible member is an insurance against damage to the tools by a blank when the socketing punch breaks.

It has been the practice heretofore in the manufacture of socketed blanks, whether the same be nuts, rivets or similar products, to have the socketing punch enter the end of the blank while such end is unsupported. As the blank is slightly smaller in diameter than the opening in the die through which it is projected, and the outer free end being unsupported, the blank can shift to a limited degree. This lack of stability invariably results in the end of the blank shifting its position under the pressure of the socketing punch. Such action imposes a lateral pressure upon the tip of the socketing punch, with the result that the tip is frequently broken off and damaged. Even if the socketing punch is able to withstand the strain of this crosswise pressure, the socket is liable to be formed off its center and an imperfect product results. The possibility of this crosswise pressure upon the tip of the socketing punch increases as the relative size of the tip decreases. These objections to the heretofore method and apparatus for socketing blanks, and the like, is overcome in this invention by rigidly supporting both ends of the blank during the socketing operation and thus prevents its lateral movement. In the mechanism herein shown the inner end of the blank is always supported during the socketing operation.

Another embodiment of this invention, aside from that hereinbefore described, is disclosed in the drawings, Figures 19 to 27, inclusive.

Figures 19, 20, 21, 22, 23, 24, 25, 26, 27:
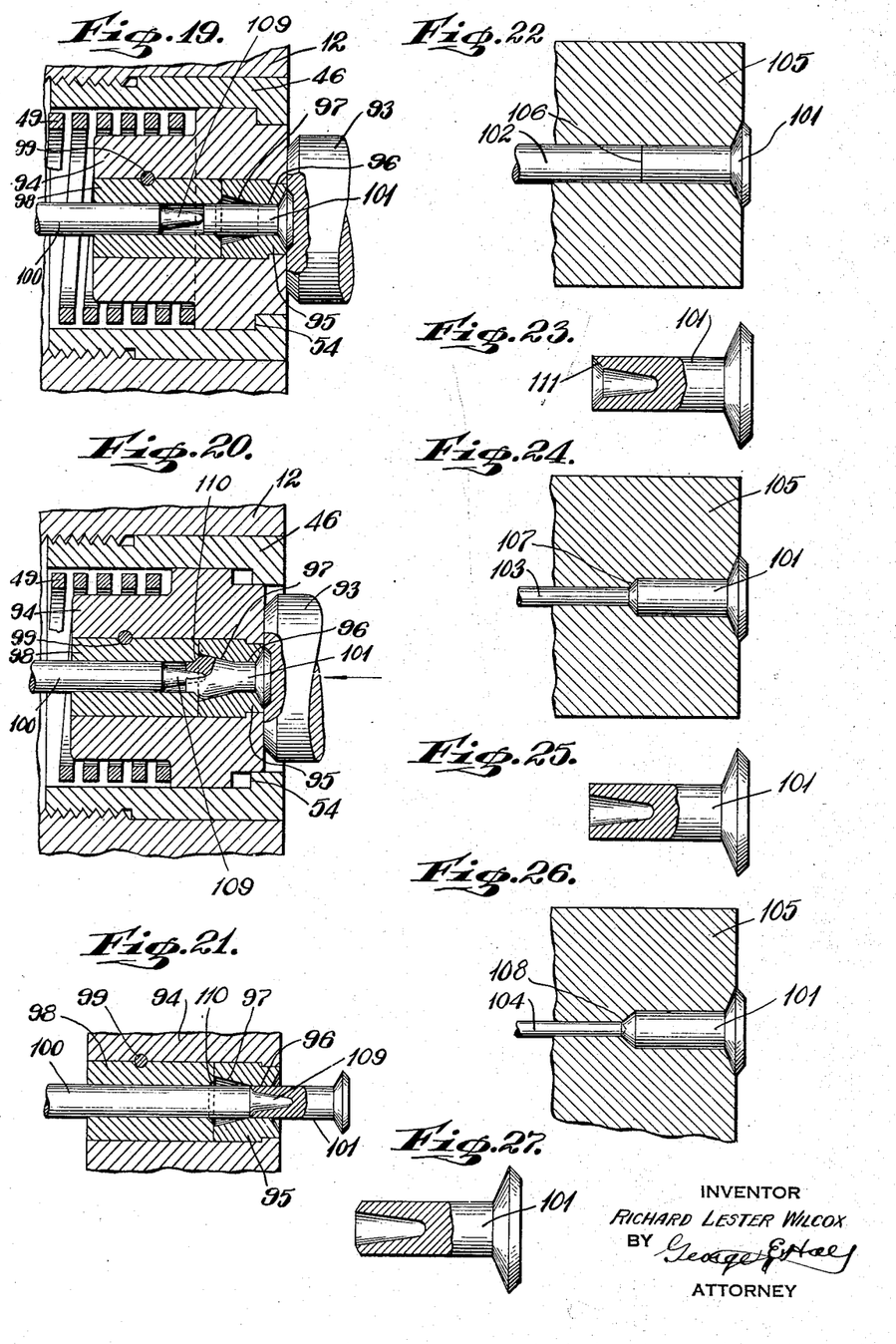
Figure 19 is another form of this invention, showing some of the tools in section, taken generally upon line 8—8 of Figure 1 with a blank positioned therein.
Figure 20 is a view similar to Figure 19, with some of the parts in different relative positions and after the blank has been partially fabricated therein.
Figure 21 is a view of some of the parts shown in Figure 20, with the blank partially ejected therefrom.
Figure 22 is a fragmentary view of an upsetting die with a headed blank positioned therein.
Figure 23 is an enlarged fragmentary view of a headed blank as completed in the tools shown in Figures 19 to 21, inclusive.
Figure 24 is another form of upsetting die with a headed blank positioned therein.
Figure 25 is an enlarged fragmentary view of a headed blank as formed in the die shown in Figure 24, and as completed by the tools shown in Figures 19 to 21, inclusive.
Figure 26 is another form of upsetting die with a headed blank positioned therein.
Figure 27 is a fragmentary enlarged view of a headed blank as formed by the die shown in Figure 26, and as completed by the tools shown in Figures 19 to 21, inclusive.

Referring particularly to Figures 19 to 21, inclusive, the structure therein disclosed differs from that shown in the prior figures, in that a floating die holder 94 is substituted in sleeve 46 for the die carrier 51 and urged outwardly by the spring 49 until the shoulder thereon engages the lip 54. This described position of the floating die holder 94 is illustrated in Figure 19. Within this die holder is a die 95, having an opening 96 therethrough terminating in a flaring throat 97 at its inner end. Concentric therewith and secured in the die holder 94 by a lock pin 99 is the inner die 98, also having a flaring throat 110. The inner end of the die holder 94 and the outer end of the die 98 are formed substantially the same as the corresponding portions of the outer die 84 and inner die 48. In this embodiment, however, the dies 95 and 98 are secured within the die holder 94 without relative movement. Movably mounted within the die 98 is a combined punch and knockout pin 100 that in structure and formation is substantially the same as the knockout pin 55, except that the socketing end has a conical tip 109. This embodiment of the invention is illustrated in connection with the fabricating of a headed rivet, although, of course, is not limited thereto. It is equally applicable in the making of socketed articles, such as first above described, or a headless rivet or the like. As shown, the headed rivet is pushed into the die 95 by the punch 93 and the inner end of the shank thereof is projected into and is supported within the opening in the die 98, with the outer end of the then stationary tip 109 in contact with the end of the shank, substantially as shown in Figure 19.

Heretofore it has been the practice to perform the socketing operation with the inner end of the tip projected into the cavity formed between the flaring throats 97 and 110, at which time such end is unsupported and may move laterally a distance equal to the accumulated tolerance space on each side of the blank within the opening. After the parts are in the position shown in Figure 19, continued pressure of the punch 93 moves the die holder 94, dies 95 and 98, and blank 101 inwardly against the stationary tip 109, which is thereby projected into the end of the blank, causing the exterior of the blank, adjacent to the outer end, to bulge or expand, into the cavity between the dies, with the inner end of the blank still retaining its original diameter in the opening in the die 98 and its original axial position. With the blank held as thus indicated, the tip 109 is projected into the blank a greater distance than heretofore possible, because the pressure is constantly axial and without a contra-crosswise pressure, which is ever present if the inner end of the blank is unsupported.

In Figure 20 the blank is illustrated after it has been bulbed or expanded, at which time the tip 109 of the pin 100 is projected a substantial distance into the end of the blank. From the position of the parts as there shown the pin 100 moves forwardly, the punch 93 withdraws and the blank is forced through the die 95. During this movement, the bulbed or expanded portion of the blank is extruded onto the tip 109 by the flaring or extrusion throat 97 to substantially the same outside diameter as the remaining portion of the shank. This extrusion lengthens the blank and the metal of the outer end is folded around the tip 109, thus increasing the depth of the socket over that shown in Figure 20.

The blank is stripped from the punch by any convenient mechanism, one form of which is well-known.

A blank as produced by the tools as shown in Figures 19, 20 and 21, is substantially the shape as shown in Figure 23, having a countersunk opening in the outer end. A die 105 for producing a blank as shown in Figures 19, 20 and 21, is of the conventional type, with a recess in one end of substantially the same shape as the under portion of the head, and in which a substantially square faced knockout pin 102 is movably mounted. When used in the header 10 herein, the die 105 is substituted for the die 26, and any one of several forms of transfer mechanism is substituted for the one shown and described.

To form a blank with a square end it is first shaped with a bevelled end in a die 105, substantially as shown in Figure 24, with such end against the knockout pin 103. A blank so formed after it has passed through the socketing and extruding operations has substantially a square end, as shown in Figure 25.

To form a blank with an outwardly flaring end, substantially as shown in Figure 27, it is first shaped in a die 105, substantially as shown in Figure 26, with the conical end of the knockout pin 104 projecting into the end of the blank.

This invention is capable of numerous modifications and changes without departing from the spirit and scope of the claims.

What is claimed is:

1. The step in the method of forming headless set screw blanks or the like, which consists in projecting a blank of substantially uniform diameter through an opennig in a die having an extrusion throat at its inner end, until the inner end of the blank projects in part beyond said throat across an open space between the die and a companion die and engaging the latter, and thereafter by pressure forcing said companion die away from the die and the blank over a socketing punch, at the same time enlarging that portion of the blank in said space and finally returning the blank through said opening and by extrusion reducing the enlarged portion to its original diameter and increasing the depth of the socket.

2. In mechanism for forming headless blanks or the like; a die having an opening therethrough terminating in an extrusion throat at its inner end; a spaced companion die having an opening therethrough with an enlarged throat at the end adjacent to the die; means for moving the companion die toward the die; a socketing punch movable within the companion die; means, as a transitory member, for moving the companion die a limited distance away from the die that first engages the socketing punch and is supported thereby.

3. In mechanism for forming headless blanks or the like; an outer stationary die member; an outer die; an inner die, each die having an opening therethrough, substantially concentric with each other, terminating in an enlarged throat which forms a cavity when the dies are in contact with or substantially in contact with each other; means for mounting said dies in the stationary member whereby the inner die is under constant tension toward the outer die; and transitory means for moving the inner die away from the outer die.

4. In mechanism for forming headless blanks; an outer die; an inner die, each die having an opening therethrough, substantially concentric with each other, terminating in an enlarged throat which forms a cavity when the dies are in contact with or substantially in contact with each other; means for mounting said dies whereby the inner die is under constant tension toward the outer die; and transitory means for moving the inner die away from the outer die, one of said dies having one or more channels for the flow of lubricant in that face thereof adjacent to the throat.

5. In mechanism for forming headless blanks; an outer die; an inner die, each die having an opening therethrough, substantially concentric with each other, terminating in an enlarged throat which forms a cavity when the dies are in contact with or substantially in contact with each other; means for mounting said dies whereby the inner die is under constant tension toward the outer die; and transitory means for moving the inner die away from the outer die, one of said dies having one or more channels for the flow of lubricant in that face thereof adjacent to the throat; and means for conveying lubricant to said channels and away therefrom, after passing through said cavity.

6. In mechanism for forming headless blanks; a stationary member; an outer die; an inner die, each die being within the stationary member and movable relatively to each other and having an opening therethrough, substantially concentric with each other, terminating in an enlarged throat which forms a cavity when the dies are in contact with or substantially in contact with each other; means for mounting said dies whereby the inner die is under constant tension toward the outer die; and positively actuated means for moving the outer die toward the inner die.

7. In mechanism for forming headless blanks; a stationary member; an outer die; an inner die, each die being within the stationary member and movable relatively to each other and having an opening therethrough, substantially concentric with each other, terminating in an enlarged throat which forms a cavity when the dies are in contact with or substantially in contact with each other; means for mounting said dies whereby the inner die is under constant tension toward the outer die; positively actuated means for moving the outer die toward the inner die, comprising in part a member which engages and applies pressure thereto; and a transitory member that moves the inner die away from the outer die.

8. In mechanism for forming headless blanks; a stationary member; an outer die; an inner die, each die having an opening therethrough, substantially concentric with each other, terminating in an enlarged throat which forms a cavity when the dies are in contact with or substantially in contact with each other; means for mounting said dies whereby the inner die is under constant tension toward the outer die and moved away from the die by the blank when first engaged thereby; and positively actuated means for moving the outer die toward the inner die, comprising in part a member which engages and applies pressure thereto.

9. In mechanism for forming headless blanks; an outer die; an inner die, each die having an opening therethrough substantially concentric with each other, terminating in an enlarged throat which forms a cavity when the dies are in contact with or substantially in contact with each other; means for mounting said dies whereby the inner die is under constant tension; and positively actuated means for moving the outer die toward the inner die, comprising in part a member which engages and applies pressure to the outer die said inner die maintaining its contact with the blank while the length of the latter is reduced during the enlargement of the portion thereof under pressure.

10. In mechanism for forming headless blanks; an outer die; an inner die, each die having an opening therethrough, substantially concentric with each other, terminating in an enlarged throat which forms a cavity when the dies are in contact with or substantially in contact with each other; means for independently supporting the blank adjacent to one of the dies; means for mounting the dies, whereby that die adjacent to the said supporting means will be free to move and relieve any excess pressure exerted by the blank against the dies.

11. In mechanism of the character described; a transfer slide; an extension member thereon, both the slide and extension member having openings therethrough of substantially the same diameter as the workpiece said openings being spaced from each other equal to the space between the center of the openings of the dies; and means, as a detent or the like movable in the end of the extension member, for applying a yielding pressure to a workpiece while in the adjacent opening.

12. In mechanism of the character described; a transfer slide; a separable extension member connected therewith, both the slide and extension member having openings therethrough of substantially the same cross sectional shape and area as the workpiece; and means, as a detent or the like, for applying a yielding pressure to a workpiece while in the opening in the extension member.

13. In mechanism of the character described; a die having an opening therein to receive a blank; and means substantially perpendicular to said opening that is in the path of the blank, that applies lateral pressure to the blank while moving outwardly from the die.

14. In mechanism of the character described; a die having an opening therein to receive a blank; and means substantially parallel to said openings for applying internal pressure to the blank while passing out of the opening, comprising in part a yielding member that overhangs said opening.

15. In mechanism of the character described; a die having an opening therein to receive a blank; and means substantially parallel to said openings for applying lateral pressure to the blank while passing out of the opening, comprising in part a yielding member having oppositely disposed portions each of which overhangs said opening.

16. In mechanism of the character described; a die having an opening therein to receive a blank; and means substantially parallel to said openings for applying lateral pressure to the blank while passing out of the opening, comprising in part a yielding member having oppositely disposed portions, each of which overhangs said opening; and means for securing the member to the die.

17. In mechanism of the character described; the combination with a tool having a bank thereon; of means for stripping the blank from the tool, comprising in part jaws having plural openings therebetween, one at one end that is smaller than the diameter of the blank, and another in rear of said opening that is larger than the first mentioned opening.

18. In mechanism of the character described, the combination with a tool having a blank thereon; of means for stripping the blank from the tool, comprising in part jaws having plural openings therebetween, one at one end that is smaller than the diameter of the blank, and another in rear of said opening that is larger than the first mentioned opening, and elastic means for normally separating the jaws.

19. In mechanism of the character described, the combination with a tool having a blank thereon; of means for stripping the blank from the tool, comprising in part a sleeve, companion jaws within the sleeve, having plural openings therein, one at one end that is substantially the diameter of the blank and another in rear thereof that is larger; and means to project the jaws in one direction within the sleeve.

20. The step in a method of forming socketed blanks from a substantially cylindrical blank, which consists in expanding by pressure a section of the blank between the ends thereof, the portions of the blank upon opposite sides of the expanded section and adjacent thereto retaining their original shape and diameter.

21. The step in a method of forming socketed blanks from a substantially cylindrical blank, which consists in expanding by pressure a section of the blank between the ends thereof, the portions of the blank upon opposite sides of the expanded section and adjacent thereto retaining their original shape and diameter, such pressure being applied at the ends of the blank.

22. The step in a method of forming socketed blanks from a substantially cylindrical blank, which consists in expanding by pressure a portion of the blank between the ends thereof, without changing the shape of the blank at its ends and forming a socket in one end thereof.

23. The step in a method of forming socketed blanks from a substantially cylindrical blank, which consists in supporting the blank at both ends thereof, forcing the same over a socketing tool and at the same time expanding the blank at that portion thereof between the supports of the blank.

24. The step in a method of forming socketed blanks from a substantially cylindrical blank, which consists in supporting the blank at both ends thereof, forming the same over a socketing tool, at the same time expanding the blank, at that portion thereof between the supports of the blank, and without changing the shape of the blank where supported.

25. The step in a method of forming socketed blanks from a substantially cylindrical blank, which consists in supporting the blank at both ends thereof, forming the same over a socketing tool, at the same time expanding the blank at that portion thereof between the supports of the blank and without changing the shape of the blank where supported, and thereafter by extrusion reducing the expanded portion to substantially the same cross sectional area as the ends of the blank.

26. The step in a method of forming socketed blanks from a substantially cylindrical blank, which consists in supporting the blank at both ends thereof, forcing the same over a socketing tool, at the same time expanding the blank at that portion thereof between the supports of the blank and without changing the shape of the blank where supported, and thereafter by extrusion reducing the expanded portion to substantially the same cross sectional area as the ends of the blank and while the socketing tool is in engagement therewith, and whereby the blank is lengthened and the socket deepened.

27. In mechanism of the character described; a die holder; companion dies therein with an opening in each of substantially the same diameter as the blank and an outwardly flaring throat at the inner ends thereof forming a cavity therebetween and whereby the blank is supported in both dies upon opposite sides of the cavity; a rigid element within which the die holder is mounted; and means for moving the die holder in one direction within the rigid element.

28. In mechanism of the character described; a die holder; companion dies therein with an opening in each of substantially the same diameter as the blank and an outwardly flaring throat at the inner ends thereof forming a cavity therebetween and whereby the blank is supported in both dies upon opposite sides of the cavity; a rigid element within which the die holder is mounted; means for moving the die holder in one direction within the rigid element; and a socketing punch mounted to move within openings in both of said dies.

29. In mechanism of the character described; a movably mounted die holder; companion dies therein with an opening in each of substantially the same diameter as the blank and an outwardly flaring throat at the inner ends thereof forming a cavity therebetween; a socketing tool mounted to move in the opening in both of said dies; means for projecting a blank through one of said dies and the inner end thereof within the opening in the other of said dies and whereby the blank is supported at both ends; means for holding the socketing tool rigid in relation to said dies while the blank is being so positioned therein; and means for moving said dies with a blank therein as a unit against the socketing tool.

30. In mechanism of the character described; a movably mounted die holder; companion dies therein with a cavity therebetween; a socketing tool mounted to move in an opening in both of said dies; means for projecting a blank through one of said dies and the inner end thereof within the opening in the other of said dies; means for holding the socketing tool rigid in relation to said dies while the blank is being so positioned therein; and means for moving said dies with a blank therein as a unit against the end of the socketing tool, and whereby that portion of the blank within said cavity is expanded without changing the shape of the blank at its opposite end.

31. In mechanism of the character described; the combination with a tool having a blank thereon; of means for stripping the blank from the tool, comprising in part jaws having plural openings therebetween, one at one end that is smaller than the blank and one in rear thereof that is substantially the diameter of the blank, the jaws being so arranged that the grip upon the blank increases with the difficulty in stripping the same off the tool and which pulls the blank off the tool parallel to the axis thereof.

32. A method for forming a blank with a socket and a countersink in one end thereof, which consists in forming a blank with a square end, then expanding the blank between its ends without changing the shape of such ends and at the same time forming a socket therein, then by extruding the expanded portion of the blank causing the metal to flow around and lengthwise of the socketing tool and the end thereof drawn to substantially a sharp outer edge, whereby a countersunk portion is formed in the end of the blank adjacent to the socket.

33. A method for forming a blank with a square end and a socket therein, which consists in forming a blank with a bevelled end, then expanding the blank between its ends without changing the shape of such ends and at the same time forming a socket in the bevelled end, then by extruding the expanded portion of the blank causing the metal to flow lengthwise of the socketing tool and whereby the metal in said bevelled end will flow endwise and form a square end on the blank adjacent to the socket.

34. A method for forming a blank with an outwardly flaring bevelled end and a socket therein, which consists in forming a bevelled end, then expanding the blank between its ends without changing the shape of such ends and at the same time forming a socket therein, then by extruding the expanded portion of the blank causing the metal to flow around and lengthwise of the socketing tool, the bevel on the blank before the same is extruded being of such length that during the extruding portion there is insufficient metal to flow to the outer end of the blank and thereby leaving the end of the blank with an outwardly extended bevelled end around the socket.

35. In mechanism for forming headless blanks or the like; a die having an opening therethrough terminating in an extrusion throat at its inner end; a spaced companion die having an opening therethrough with an enlarged throat at that end thereof adjacent to the die; means for moving the companion die toward the die; a socketing punch movable within the companion die that projects into the throat of the companion die when the latter is in its retracted position; means as a transitory member for moving the companion die away from the die, the socketing punch entering a depression in the transitory member and supporting the inner end thereof projecting into the open space between the dies before said member engages the companion die.

36. In mechanism of the character described; a die having an opening therein to receive a blank; a yielding member secured to the face of the die and having two substantially parallel portions that extend across the face of the die adjacent to but inside of the wall of the openings in the die.

37. In a blank forming mechanism; a die having an opening of substantially the same diameter as the blank extending therethrough which is enlarged between its ends to form a cavity; a socketing punch, the body of which is substantially the same diameter as the said opening and held fixed in one of its relative positions with the tip thereof projecting into said cavity; and means for projecting a blank into the opening in said die, with the inner end thereof projected into and supported in the opening beyond the cavity, further movement of said means forcing the blank over the tip of the socketing punch and enlarging the cross sectional area of the blank within the cavity while still supported at each end in said opening.

38. The method of forming headless set screw blanks or the like from a wire length with punch and die mechanism, comprising severing a portion of a wire length to form a blank, then by pressure in one operation and without changing the diameter of the blank, and while the same is in the opening in a die, beveling the outer edge of one end of the blank and forming a relatively shallow depression therein and squaring the opposite end by a punch within the opening in the die, so that such end is perpendicular to the length of the blank, then deepening the depression to form a socket of limited depth and expanding a section of the blank between the ends thereof, with the adjacent portions of the blank upon opposite sides of the expanded section retaining substantially their original diameter, and finally reducing such expanded section to substantially its original diameter and extending the depth of the socket, both such expansion and reduction being accomplished while the blank is moving in opposite directions in said die.

39. The method of forming headless set screw blanks or the like from a substantially cylindrical blank by forming a relatively shallow depression in one end and squaring the opposite end so that it is perpendicular to the length of the blank, all while the blank is entirely within the opening of a die, then deepening the depression while the blank is still within said die opening, to form a socket of limited depth, and at the same time expanding a section of the blank between the ends thereof with the adjacent portions of the blank upon opposite sides of the expanded section retaining their original diameter and finally reducing such expanded section to substantially its original diameter in cross section and extending the depth of the socket, both such expansion and reduction being accomplished while the blank is moving in opposite directions in said die.

40. The step in a method of forming headless set screw blanks or the like from a substantially cylindrical blank, which consists in forming by one pressure operation a bevelled edge on one end of the blank with a relatively shallow depression in the same end and squaring the opposite end so that it is perpendciular to the length of the blank, all while the blank is entirely within the opening of a die, then while the blank is supported at both ends, enlarging by pressure a section of the blank between the ends thereof, the adjacent portions of the blank upon opposite sides of the expanded portion being of uniform diameter and deepening the depression to form a socket, and finally by extrusion reducing the enlarged portion to its original cross sectional shape and reducing the depth of the socket.

RICHARD LESTER WILCOX.